Jan. 2, 1934. K. WILDE Re. 19,039

REMOTE CONTROL INDICATOR SYSTEM

Original Filed Oct. 22, 1927 2 Sheets-Sheet 1

Inventor:
Kurt Wilde
by
Lyons, Kellenberg & Farley
Attorneys.

Jan. 2, 1934. K. WILDE Re. 19,039

REMOTE CONTROL INDICATOR SYSTEM

Original Filed Oct. 22, 1927 2 Sheets-Sheet 2

Inventor:
Kurt Wilde
by
Lotka, Kehlenbeck & Farley
Attorneys.

Reissued Jan. 2, 1934

Re. 19,039

UNITED STATES PATENT OFFICE 19,039

REMOTE CONTROL INDICATOR SYSTEM

Kurt Wilde, Berlin-Wilmersdorf, Germany, assignor, by mesne assignments, to Builders Iron Foundry, Providence, R. I., a corporation of Rhode Island Original No. 1,822,683, dated September 8, 1931, Serial No. 227,933, October 22, 1927, and in Germany October 23, 1926. Application for reissue September 7, 1933. Serial No. 688,531

7 Claims. (Cl. 177—351)

This invention relates to that type of systems for transmitting the indications of a measuring instrument to a distance (see for instance Roucka's U. S. Letters Patent No. 1,597,828 of August 31, 1926) in which the receiver is operated periodically in accordance with the position of the pointer of the measuring instrument serving as a transmitter, and in which the transmitter is provided with a tester for this purpose and for each transmission of a pointer position or the like, effects two contacts, one of them when the said tester reaches a predetermined position, and the other when the tester reaches the pointer or equivalent member.

If these contacts are effected in such a manner as to close the circuit of the transmission line but momentarily, and if the first current impulse is employed for starting that member of the receiver which is to be shifted, while the second current impulse is employed to stop such member, there is danger of additional current impulses arising in the transmission line between said two impulses, for instance owing to disturbances in the line, induction effects, etc., and these additional current impulses will cause the receiver to give wrong indications.

In order to guard against this drawback, I operate the receiver by means of currents caused to flow through the transmission line during a length of time corresponding to the time interval between the making of the above-mentioned two contacts, the first contact starting the flow of current and the second stopping such flow.

With this arrangement I secure the advantage that no disturbing effects will result at the receiver in the event that extraneous currents should, by induction, produce fluctuations in the strength of the current flowing through the transmission line. Furthermore, there will be no need of maintaining synchronism of transmitter and receiver permanently, but it will suffice to maintain such synchronism during the time that current is flowing through the transmission line. Such temporary synchronism may be obtained by relatively simple driving motors, for instance of the type having only a mechanical speed governor; such motors therefore would not require any electric interaction.

Figure 1:
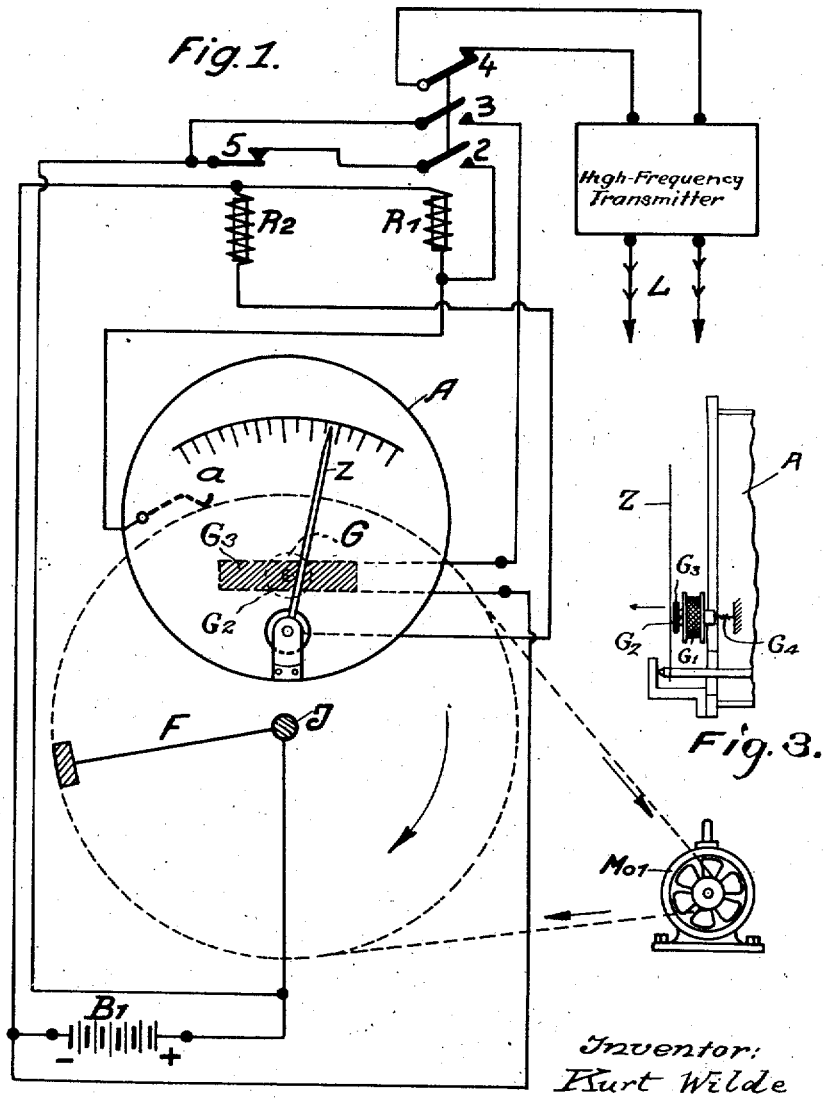
Figure 2:
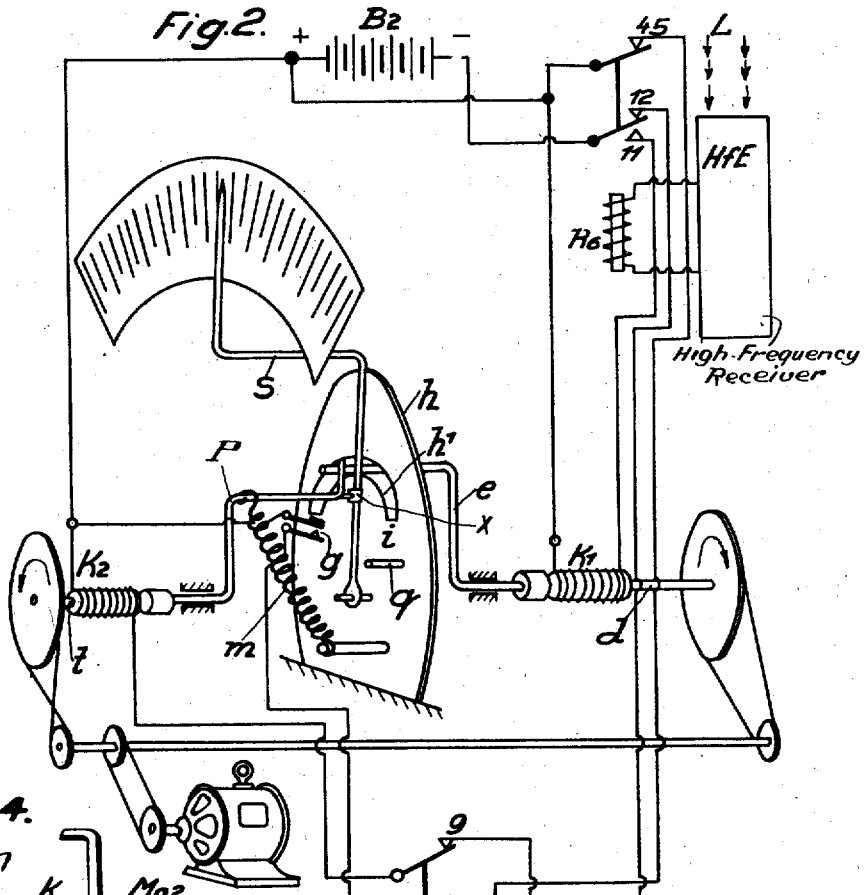

In the accompanying drawings, Fig. 1 is a diagrammatic view, with parts in section, illustrating, as an example, a transmitter for carrying out my invention, and Fig. 2 is a diagrammatic view of a receiver suitable for the purposes of my invention.

Figure 4:
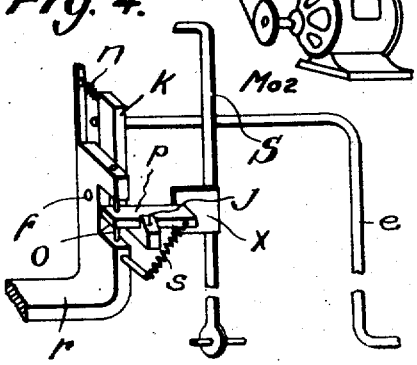

Fig. 3 is an elevation, with parts in section, showing the pointer Z of Fig. 1 and a brake or arresting mechanism co-operating therewith; and Fig. 4 is a detail perspective view of certain parts that co-operate with the pointer S of Fig. 2.

In Figure 1 A is a measuring instrument, for instance a wattmeter showing kilowatts, having a pointer Z moving freely over a scale. At the beginning or left hand of the scale is a fixed contact *a* in position to be wiped by a tester F which is rotated about the point J by an electric motor Mo1. On the end of the tester is a brush or other sliding contact member which touches the pointer as the tester goes around. The tester is connected to one pole of battery B1, the stationary contact *a* and the pointer Z to the relays R1 and R2 respectively. When the tester F, rotating in the direction of the arrow, touches contact *a* relay R1 is excited. At contact 2 it completes a holding circuit for itself over back contact 5 of relay R2. At contact 3 it puts in circuit the energizing coil of a brake which arrests the pointer Z until the tester F reaches it. When this happens relay R2 is momentarily excited over tester F and pointer Z. The relay interrupts the holding circuit of relay R1 at contact 5 with the result that said brake is put out of action. This brake or arresting mechanism may be constructed, for instance, as shown in Figs. 1 and 3. G′ is a stationary coil within which is movable longitudinally, in a direction parallel to the axis of the pointer Z, a core $G_2$ carrying a plate or bar $G_3$ adapted to engage said pointer. A spring $G_4$ tends to keep the plate or bar $G_3$ out of contact with the pointer Z, so as to allow the latter to move freely. This plate or bar is indicated in Fig. 1 by a shaded rectangle. Whenever the coil G′ is energized, the core $G_2$ will be moved in the direction of the arrow in Fig. 3, against the action of the spring $G_4$, and thus the plate or bar $G_3$ will be brought against the pointer Z with sufficient pressure to prevent such pointer from being carried along by the tester F during its rotation.

During the time required for tester F to move from contact *a* to the pointer Z relay R1 is excited and the short-circuit of the high frequency supply or transmitter H/s by contact 4 is interrupted, so that during this time high frequency current flows to line L. At the receiving station, Figure 2, the high frequency receiver H/E responds to this current by exciting the relay R6 as long as the current flows. Relay R6 closes contact 11 and opens contacts 12 and 45. Contact 11 puts in circuit the magnetic clutch K1, thereby coupling crank arm *e* with shaft *d* which is constantly rotated in the direction of the arrow by motor Mo2. The end of arm *e* moves in a slot in disc *h* and starts from contact *g* which corresponds with contact *a* of the transmitter. If it encounters the pointer S during its movement it carries the pointer with it as far as it goes, that is to say so long as relay R6 is excited. The pointer S is double cranked so that its end may move over a scale on the front of the receiver casing. The distance of pointer S from the point *g* corresponds with the distance of pointer Z from point *a*; in other words the two pointers have the same position on their respective scales.

Upon relay R6 de-energizing clutch K1 is taken out, and the circuit of clutch K2 completed at contact 12 over contact 9 of relay R5. Clutch K2 connects the arm *r*, normally held by spring *m* at the end *i* of slot *h*1, with shaft *t* which is driven in the opposite direction to shaft *d*. Arm *r* is turned from *i* to *g*, meeting arm *e* on its way and taking it along to *g* while the balanced pointer S remains where it is. As soon as arm *r* reaches contact *g* the circuit of relay R5 is closed, the relay excites, completes at contact 10 a holding circuit for itself over contact 45 of relay R6, and breaks at contact 9 the circuit of clutch K2 so freeing arm *r* to be returned by spring *m* to its position of rest *i*. The apparatus is then ready for the next transmission, and until that occurs relay R5 remains excited; it is de-energized when relay R6, excited afresh over the line L, opens contacts 12 and 45.

It will sometimes occur that arm *e* will come to a stand-still before it reaches pointer S, the preceding deflection having been greater. Means are then required to return pointer S to the position at which arm *e* stops. For this purpose the end of arm *r* is fitted with a movable finger *p* which strikes a lug *x* on the pointer S and carries it along to arm *e*. At the instant arm *r* touches arm *e* the resistance of the latter puts the finger out of action, so that the pointer S is freed and stands still, while the two arms *r* and *e* move on to *g*. This mechanism is shown upon an enlarged scale in Fig. 4. The finger *p* is pivoted at *o* by the upwardly extending end of the arm *r* and is normally held, against the action of a spring *s*, in the position shown in Fig. 4, by a hook *j* secured to the bell-crank lever *k* fulcrumed at *f* on the arm *r*, and normally held in locking engagement with the finger *p* by the action of a spring *n*. When the said finger *p* engages the lug *x* on the pointer S, the latter is carried along until the radial arm of bell-crank lever *k* strikes against arm *e*. As arm *r* continues to move, the resistance of arm *e* suffices to rock bell-crank lever *k* so that it will release the finger *p*. Said finger then slips past lug *x*, and the pointer S is left behind. On the other hand, arm *e* is carried along by the radial arm of bell-crank lever *k*, to the abutment *q*. When thereupon arm *r* returns clockwise, finger *p*, being held in a slanting position by the spring *s*, clears the lug *x* and passes by it without touching it, so that the pointer S is not moved at this time. When the arm *r* strikes against abutment *q*, finger *p* is again pressed behind hook *j* and is thus ready once more to carry along the pointer S to the position of the arm *e*.

In this example of the invention the parts S, *e*, *r* are designed to correspond with the parts Z, F so that the deflection of pointer S is always exactly proportional to that of the pointer Z. The invention is not however limited to such correspondence. Agreement of the showings of the two pointers may be got by proper calibration of the receiver scale. There is in practice no difficulty in making the tester F and pointer Z coaxial; they are shown on different axes only for the sake of clearness.

What I claim is:

1. A system for transmitting the indications of an instrument to a distance, comprising a transmitting measuring instrument, a transmission line and a receiving instrument, the transmitting instrument having a scale and a member positioning itself in correspondence with the magnitude to be measured, a contact arranged at a fixed point of said scale, a movable tester at said instrument, means for moving said tester periodically over said contact and said member, said tester cooperating with said contact and said member to perform two circuit-controlling operations, means for maintaining a current flow over said transmission line during the time interval between the said two controlling operations of the tester, said receiving instrument having a member adapted to be moved so as to indicate the position of the said member of the transmitting instrument, and means for starting said indicating member of the receiving instrument by the first, and for stopping it by the second contact control at the transmitting instrument.

2. A system for transmitting the indications of an instrument to a distance, comprising a transmitting measuring instrument, a transmission line and a receiving instrument, the transmitting instrument having a scale and a member positioning itself in correspondence with the magnitude to be measured, a contact arranged at a fixed point of said scale, a revoluble tester at said instrument, means for revolving said tester periodically over said contact and said member, said tester cooperating with said contact and said member to perform two circuit-controlling operations, means for maintaining a current flow over said transmission line during the time interval between the said two controlling operations of the tester, said receiving instrument having a member adapted to be moved so as to indicate the position of the said member of the transmitting instrument, and means for starting said indicating member of the receiving instrument by the first, and for stopping it by the second contact control at the transmitting instrument.

3. A system for transmitting the indications of an instrument to a distance, comprising a transmitting measuring instrument, a transmission line and a receiving instrument, the transmitting instrument having a scale and a member positioning itself in correspondence with the magnitude to be measured, a contact arranged at a fixed point of said scale, a movable tester at said instrument, means for moving said tester periodically over said contact and said member, said tester cooperating with said contact and said member to perform two circuit-controlling operations, two relays one of which is arranged to receive current upon engagement of said fixed contact by the tester, and to open at that time a short-circuit associated with the transmitting instrument and with the transmission line, while the other of said relays is arranged to receive current upon engagement of said member by the tester and to render such first-mentioned relay inoperative, said receiving instrument having a member adapted to be moved so as to indicate the position of the said member of the transmitting instrument, and a relay for starting said indicating member of the receiving instrument by the first, and for stopping it by the second contact control at the transmitting instrument.

4. A system for transmitting the indications of an instrument to a distance, comprising a transmitting measuring instrument, a transmission line and a receiving instrument, the transmitting instrument having a scale and a member positioning itself in correspondence with the magnitude to be measured, a contact arranged at a fixed point of said scale, a movable tester at said instrument, means for moving said tester periodically over said contact and said member, said tester cooperating with said contact and said member to perform two circuit-controlling operations, means for arresting said member when it is reached by the tester, means for maintaining a current flow over said transmission line during the time interval between the said two controlling operations of the tester, said receiving instrument having a member adapted to be moved so as to indicate the position of the said member of the transmitting instrument, and means for starting said indicating member of the receiving instrument by the first, and for stopping it by the second contact control at the transmitting instrument.

5. In a telemetric system, a transmitter, a receiver and a circuit connecting said transmitter with said receiver, said transmitter comprising quantity responsive means, motor means continuously operable at substantially constant speed and means controlled jointly by said means to produce a signal in said circuit of a time duration corresponding to said quantity, and said receiver comprising substantially constant speed motor means and means actuated thereby for the duration of said signal.

6. In a telemetric system, a transmitter, a receiver and a circuit connecting said transmitter with said receiver, said transmitter comprising quantity responsive means, driving means continuously operable at substantially constant speed and means cyclically operable under the control of said means to produce signals in said circuit of time durations corresponding to said quantity, and said receiver comprising means cyclically operable in approximate synchronism with said transmitter driving means for the duration of said signals.

7. In a telemetric system, a transmitter, a receiver and a circuit connecting said transmitter with said receiver, said transmitter comprising quantity responsive means, driving means continuously operable at substantially constant speed and means cyclically operable under the control of said means to produce signals in said circuit of time durations corresponding to said quantity, and said receiver comprising means cyclically operable in approximate synchronism with said transmitter driving means for the duration of said signals, and indicating means positionable by said last named means.

KURT WILDE.